United States Patent
Lo et al.

(10) Patent No.: US 10,855,947 B2
(45) Date of Patent: *Dec. 1, 2020

(54) AUDIO-VIDEO CONTROL SYSTEM

(71) Applicant: AMTRAN TECHNOLOGY CO., LTD, New Taipei (TW)

(72) Inventors: Kuo Chih Lo, New Taipei (TW); Tung Hsun Tsou, New Taipei (TW); Chin Cheng Liu, New Taipei (TW)

(73) Assignee: AMTRAN TECHNOLOGY CO., LTD, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,164

(22) Filed: Dec. 21, 2018

(65) Prior Publication Data

US 2019/0208156 A1    Jul. 4, 2019

(30) Foreign Application Priority Data

Dec. 29, 2017 (TW) .............................. 106146361 A

(51) Int. Cl.
*H04N 5/60* (2006.01)
*G06F 3/16* (2006.01)
(Continued)

(52) U.S. Cl.
CPC .............. *H04N 5/60* (2013.01); *G06F 3/165* (2013.01); *H04N 5/602* (2013.01); *H04N 17/04* (2013.01); *H04N 21/42203* (2013.01); *H04N 21/42206* (2013.01); *H04N 21/4394* (2013.01); *H04N 21/4852* (2013.01); *G10L 15/22* (2013.01); *G10L 15/30* (2013.01); *G10L 19/00* (2013.01); *G10L 19/008* (2013.01); *H04N 5/144* (2013.01); *H04N 2017/006* (2013.01)

(58) Field of Classification Search
None
See application file for complete search history.

(56) References Cited

U.S. PATENT DOCUMENTS 9,689,960 B1 * 6/2017 Barton ................. G01S 3/8083
10,446,165 B2 * 10/2019 Giacobello ......... G10L 21/0208
(Continued)

FOREIGN PATENT DOCUMENTS

CN             200953604 Y        9/2007

*Primary Examiner* — Paulos M Natnael
*Assistant Examiner* — Sean N. Haiem
(74) *Attorney, Agent, or Firm* — Maschoff Brennan

(57) ABSTRACT

An audio-video control system comprises a first audio sensor, a controller, an audio player, a first motion sensor and a processor. The first audio sensor receives a first audio signal in a first area when the first audio sensor is enabled. The controller determines whether the first audio sensor receives the first audio signal. The first motion sensor detects a motion of a first object in the first area to generate a first motion detecting signal. The controller enables the first audio sensor according to the first motion detecting signal. The processor controls the first and second devices via a local area network, controls the audio player to play an audio notifying signal according to the first motion detecting signal, and processes the first audio signal to obtain a control signal to selectively control the first device or the second device when the source of the first audio signal corresponds to the first account.

11 Claims, 2 Drawing Sheets

(51) Int. Cl.
  *H04N 17/04*   (2006.01)
  *H04N 21/485*  (2011.01)
  *H04N 21/439*  (2011.01)
  *H04N 21/422*  (2011.01)
  *H04N 17/00*   (2006.01)
  *H04N 5/14*    (2006.01)
  *G10L 15/22*   (2006.01)
  *G10L 19/00*   (2013.01)
  *G10L 15/30*   (2013.01)
  *G10L 19/008*  (2013.01)

(56) References Cited

U.S. PATENT DOCUMENTS

| | | | |
|---|---|---|---|
| 10,607,605 B2* | 3/2020 | Jeon | H04M 9/082 |
| 2003/0046557 A1* | 3/2003 | Miller | G06F 21/32 |
| | | | 713/186 |
| 2006/0147055 A1* | 7/2006 | Ise | H04R 3/02 |
| | | | 381/95 |
| 2008/0091434 A1* | 4/2008 | Rodriguez | G06F 17/2735 |
| | | | 704/275 |
| 2009/0016540 A1* | 1/2009 | Heningsen Nielsen | |
| | | | H03G 1/02 |
| | | | 381/56 |
| 2013/0124207 A1* | 5/2013 | Sarin | G10L 15/22 |
| | | | 704/275 |
| 2015/0003622 A1* | 1/2015 | Lee | H04R 1/1033 |
| | | | 381/71.6 |
| 2015/0172878 A1* | 6/2015 | Luna | H04W 4/12 |
| | | | 455/412.2 |
| 2017/0103755 A1* | 4/2017 | Jeon | H04L 12/2821 |
| 2018/0018967 A1* | 1/2018 | Lang | G06F 3/165 |
| 2018/0321905 A1* | 11/2018 | Fountaine | G06F 3/165 |
| 2019/0096419 A1* | 3/2019 | Giacobello | G10L 21/02 |

* cited by examiner

AUDIO-VIDEO CONTROL SYSTEM

CROSS-REFERENCE TO RELATED APPLICATIONS

This non-provisional application claims priority under 35 U.S.C. § 119(a) on Patent Application No(s). 106146361 filed in Republic of China on Dec. 29, 2017, the entire contents of which are hereby incorporated by reference.

BACKGROUND

1. Technical Field

This disclosure relates to an audio-video (AV) control system, especially for an AV controls system having the function of internet of things (IoT).

2. Related Art

An AV control system is generally installed in a living room or a master bedroom so that a user can control devices of the video-audio control system, such as a television, a stereo, or other devices related to audio and visual feelings such as lights. However, the general AV control system still need instructions issued by the user.

Although there are some intelligent control systems that can be controlled by voices recently, however the user firstly needs to send a wake-up instruction to these intelligent control systems, and then the user can use the intelligent control systems to control other home appliances. However, the user is confused to use these intelligent control systems.

SUMMARY

According to one or more embodiment of this disclosure, an audio-video (AV) control system is provided. The AV control system is adapted to control a first device and a second device, and the AV control system comprises a first audio sensor, a controller, an audio player, a first motion sensor and a processor. The first audio sensor is adapted to receive a first audio signal in a first area when the first audio sensor is enabled. The controller is communicatively connected to the first audio sensor and at least determines whether the first audio sensor receives the first audio signal. The audio player is communicatively connected to the controller. The first motion sensor is communicatively connected to the controller and is adapted to detect a motion of a first object in the first area so as to generate a first motion detecting signal. The controller enables the first audio sensor according to the first motion detecting signal. The processor is communicatively connected to the controller and controls the first and second devices via a local area network. The processor controls the audio player to play a prompting audio signal according to the first motion detecting signal and determines whether a source of the first audio signal corresponds to a first account, the processor further processes the first audio signal to obtain a control signal to selectively control the first device or the second device when the source of the first audio signal corresponds to the first account.

In view of the above description, the AV control system is automatically switched between a standby mode and an interactive mode by the first motion sensor so that a user can use the AV control system without sending a wake-up instruction.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
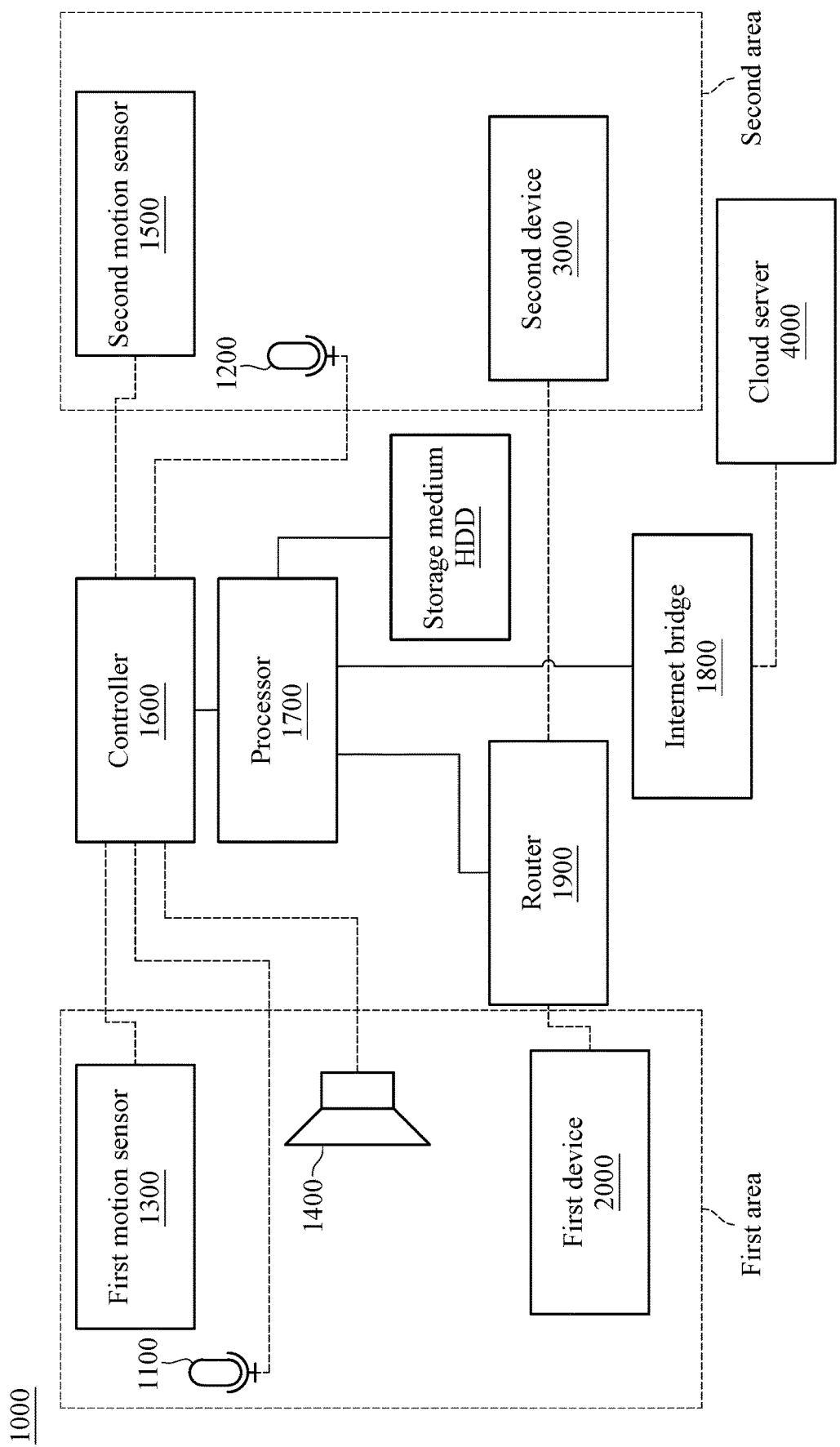
FIG. 1 is a functional block diagram of an AV control system according to an embodiment of the present disclosure.

Please refer to FIG. 1 which is a functional block diagram of an AV control system according to an embodiment of the present disclosure. The AV control system 1000 is adapted to control a first device 2000 and a second device 3000. The AV control system 1000 comprises a first audio sensor 1100, a first motion sensor 1300, an audio player 1400, a controller 1600, a processor 1700, an internet bridge 1800, and a router 1900. The controller 1600 is communicatively connected to the first audio sensor 1100, the first motion sensor 1300, the audio player 1400, and the processor 1700. The term "communicatively connected" in the following embodiments of the present disclosure means that there are signal packets transmitting between two devices in wired or wireless manner, and the present disclosure is not limited. For example, the first device 200 can be a television and the second device 3000 can be a stereo. However, the first device 2000 and the second device 3000 may also be, for example, an intelligent home appliance having an Internet of Things (IoT) capability such as an air conditioner, a fan, an electric lamp, a monitor, and the like, which is not limited in the present disclosure.

The first audio sensor 1100 is adapted to receive a first audio signal in a first area when the first audio sensor 1100 is enabled. Specifically, the first audio sensor 1100 has, for example, a microphone and an analog to digital converter (not shown). The microphone can receive the first audio signal in a sound form in the first area and convert the sound form of the first audio signal into an analog form. The analog to digital converter can convert the analog form of the first audio signal into a digital form. "First area" in the following embodiments of the present disclosure can be a main bedroom in a house, which is not limited in the present disclosure.

The first motion sensor 1300 is adapted to detect a motion of the first object in the first area so as to generate a first motion detecting signal. Specifically, the first motion sensor 1300 may be, for example, an infrared first motion sensor and can detect a movement of a living organism (for example, a human body or a pet body) by detecting changes of infrared rays emitted from the living organism. In one embodiment, the first motion sensor 1300 generates an infrared pattern when receiving infrared rays in the first area. The first motion sensor 1300 generates a first motion detecting signal when an infrared region (corresponding to the living organism) in the infrared map is changed. In another embodiment, although the infrared region in the infrared pattern is changed, the first motion sensor 1300 does not generate the first motion detecting signal when the area (the number of pixels) of the infrared region is less than a first threshold. The first motion sensor 1300 generates the first motion detection signal only when the area of the infrared region is greater than the first threshold. In other words, the first motion sensor 1300 can determine whether the living organism in the first area is a person or a pet according to the area of the infrared region. Further, it is possible to determine whether the living organism does an action according the change of the infrared region. According to the above description, the first motion sensor 1300 generates the first motion detecting signal when a living organism which is determined as a human moving and doing an action in the first area. Once the area of the infrared region corresponding to the living organism is not large enough such that the living organism is determined as a pet, the first motion sensor 1300 does not generate the first motion detecting signal.

The controller 1600 is communicatively connected to the first audio sensor 1100 and the first motion sensor 1300. The first audio sensor 1100 is typically in a disabled state when it does not work to save the power consumption. When receiving the first motion detecting signal, the controller 1600 can enable the first audio sensor 1100 to switch the disabled state of the first audio sensor 1100 to an enabled state of the first audio sensor 1100. In one embodiment, the controller 1600 is electrically connected to the first audio sensor 1100 in a wired manner. The controller 1600 enables the first audio sensor 1100 when receiving the first motion detecting signal. In another embodiment, the first audio sensor 1100 and the controller 1600 communicate with each other in a wireless manner. In this embodiment, the circuit of the first audio sensor 1100 comprises a sound receiving portion and a communication portion. The sound receiving portion is normally in a disabled state while not working, and the communication portion is always maintained in an enabled state. When the controller 1600 receives the first motion detecting signal, the controller 1600 sends a wireless packet to the communication portion of the first audio sensor 1100 to enable the sound receiving portion of the first audio sensor 1100. In an embodiment, when the first audio sensor 1100 does not receive any audio signal for a period of time (e.g., one minute), the first audio sensor 1100 automatically enters into the disabled state. In another embodiment, when the first motion sensor 1300 does not generate the first motion detecting signal for a period of time (e.g., one minute), the controller 1600 controls the first audio sensor 1100 to enter into the disabled state. In addition, the controller 1600 further determines whether to receive the first audio signal.

The processor 1700 connects to an internet by the internet bridge 1800 and controls the first device 2000 and the second device 3000 in the local area network by the router 1900. In one embodiment, when the first motion sensor 1300 generates the first motion detecting signal, the processor 1700 controls the audio player 1400 to play an audio notifying signal via the controller 1600. For example, when a user appears in the first area at 8 o'clock in the morning, the first motion sensor 1300 generates the first motion detecting signal, and then the processor 1700 controls the audio player 1400 play a voice signal via the controller 1600 to notify the user that the first audio sensor 1100 is ready to receive sound signals. For example, the content of the voice signal includes "Good morning, what can I serve for you".

Moreover, the processor 1700 can analyze the first audio signal to determine or recognize whether a source of the first audio signal corresponds to a first account. When the source of the first audio signal corresponds to the first account, the processor 1700 processes the first audio signal to obtain a corresponding control signal, and selectively controls the first device 2000 or the second device 3000. The aforementioned source of the first audio signal refers to an object that emits a sound associated with the first audio signal. Specifically, the processor 1700 analyzes whether the feature of the first audio signal matches the voiceprint of the first account, and when the processor 1700 determines that the feature of the first audio signal matches the voiceprint of the first account, the processor 1700 processes the first audio signal to obtain a control signal.

In an embodiment, the user can set the AV control system 1000 in a training mode. In the training mode, the processor 1700 can determine whether the first audio signal matches the voiceprint of the first account. When the first audio signal matches the voiceprint of the first account, the processor 1700 may generate a first instruction set corresponding to the first account according to the instructions related to the source of the first audio signal for operating the first device 2000 and/or second device 3000 for a time period. When the processor 1700 determines that the first audio signal does not match the voiceprint of the first account, or the voiceprint of the first audio signal does not conform to the voiceprint of any one account, the processor 1700 may output a notifying signal to request the source of the first audio signal to add a new account.

In another embodiment, the processor 1700 further records a piece of time information into a storage medium, such as hard disk drive (HDD). When the processor 1700 processes the first audio signal according to the first instruction set to obtain the control signal, a piece of the time information can be considered, which means the processor 1700 of the present invention can add a piece of the time information to generate a control signal in addition to the first instruction set, thereby the control signal may conform to a habit or a preference of a user. In an embodiment, the time information may be that the first audio signal may be sent in a time period everyday within a preset time period (for example, one week or one month), so that the first device 2000 performs a specific function with a constant frequency. For example, the same user usually chooses to watch a news channel in the morning, and usually chooses to watch a movie channel at night. After using the AV control system 1000 for a period, when the user says "Turn on the television (TV)" after getting up in the morning, the processor 1700 may output a control signal to turn on the second device 3000 (television) and switch an original channel to a news channel. When the user goes home and says "Turn on the TV" at night, the processor 1700 may output a control signal to turn on the second device 3000 and switch an original channel to a movie channel.

In an embodiment, for example, the first instruction set of the first account may be stored in a cloud server 4000. The processor 1700 communicates with the cloud server 4000 over the internet via the internet bridge 1800. The processor 1700 can transmit the first audio signal to the cloud server 4000 to cause the cloud server 4000 to analyze and process the first audio signal and generate a control signal according to analyzed and processed results. The processor 1700 then obtains the control signal from the cloud server 4000 via the internet bridge 1800. Specifically, in the previous embodiment, the first instruction set is stored in the local storage medium, which can shorten the computing time of processing the first audio signal to obtain the control signal. The complexity of instruction and/or the number of instructions that can be processed is limited by the capability of the processor 1700 and the storage space of the storage medium. In this embodiment, the first instruction set is stored in the cloud server 4000. In other words, the process of analyzing and processing the first audio signal to obtain the control signal is performed by the cloud server 4000, so that a more complex neural network of an artificial intelligence system (operated in the cloud server) may be sued to process complex instructions and more instructions. However, the time used for processing the first audio signal to obtain the control signal is more than that of the previous embodiment.

In one embodiment, for example, when the AV control system has been trained and recorded over a period (e.g., one week or one month), the first instruction set may be recorded as a behavioral mode instruction set. For example, a user gives instructions to turn on a news channel of a TV, and to turn off an air conditioner after the user gets up every morning. The user gives instructions to turn on the air conditioner, to set the temperature of the air conditioner as 24 degrees Celsius, to set the air conditioner in a sleep mode, and to turn on HBO channel of the TV after the user comes back to the main bedroom every evening. Therefore, when the first action sensor 1300 detects that there is an object doing an action in the first area at 7 o'clock in the morning, the first action sensor 1300 sends a motion detecting signal to the controller 1600. Then the controller 1600 directly sends the motion detecting signal to the processor 1700, and the processor 1700 directly turn on the first device 2000 (television) and switch the original channel of the first device 2000 to a news channel while the processor 1700 turns off the air conditioner (not shown).

In some cases, the user may give voice commands while watching the television (first device 2000) in the first area (main bedroom). In this case, sounds emitted by the first device 2000 may cause difficulty in processing the first audio signal. In order to increase the sound receiving accuracy of the first audio sensor 1100 in such condition, the processor 1700 in another embodiment may obtain an audio playing signal being played from the first device 2000. The processor 1700 restrains noises of the first audio signal to obtain a second audio signal according to the audio playing signal, and then processes the second audio signal to obtain a control signal. The processor 1700 directly obtains the audio playing signal in electronic signal format from the first device 2000 via the local area network.

Figure 2:
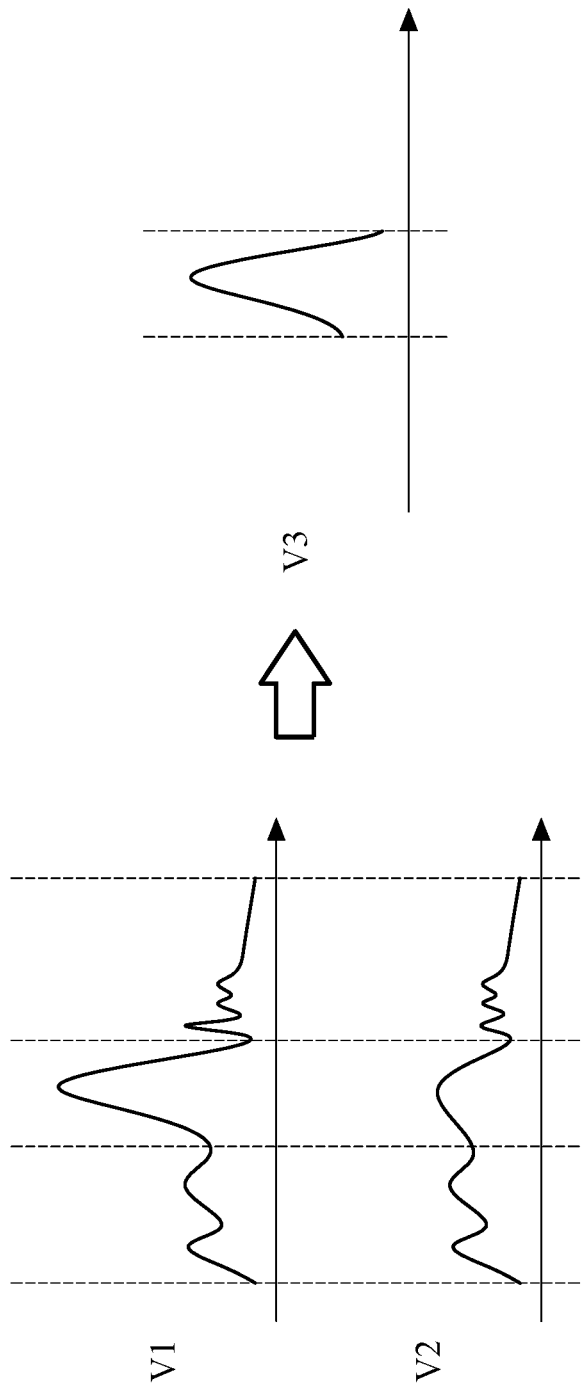
FIG. 2 is a schematic view of restraining noises of an AV control system according to an embodiment of the present disclosure.

Specifically, please refer to FIG. 2 which is a schematic view of restraining noises of an AV control system according to an embodiment of the present disclosure. In FIG. 2, a first audio signal V1 is an audio signal received by the first audio sensor 1100. The audio signal may include sounds emitted by a source of the first audio signal V1 (for example, the user of the first account) and sound signals actually played by the first device 2000. An audio playing signal V2 is directly obtained from the first device 2000 by the processor 1700 and it is not received and processed by the first audio sensor 1100. As shown in FIG. 2, a second audio signal V3 is obtained after the audio playing signal V2 is subtracted from the first audio signal V1. Since the audio playing signal V2 is obtained from the first device 2000, the processor may directly subtract a sound played by the first device 2000 from the first audio signal V1, which should be a sound emitted by a user in the first area.

There is a time difference between a first time point at which the first device 2000 plays a sound signal and a second time point at which the first audio sensor 1100 receives the sound signal emitted by the first device 2000. For eliminating an influence of sounds played by the first device 2000 more accurately, in one embodiment, the processor 1700 can directly obtain an audio testing signal played by the first device 2000 in the training mode, and then the first audio sensor 1100 receives the audio testing signal. After the processor 1700 analyzes and processes the obtained audio testing signal and the received audio testing signal, a time difference T between the two audio testing signals can be obtained. The processor 1700 may subtract a delayed audio testing signal from the first audio signal according to the time difference T to obtain the second audio signal when the processor 1700 restrains noises of the first audio signal V1.

The audio signal played by the first device 2000 is usually carried with audio information and loudness information. However, the processor 1700 actually can't obtain a relationship between the loudness information and the strength of the audio signal received via the first audio sensor 1100, and the loudness of the audio signal received by the first audio sensor 1100 is different from the loudness of the audio signal played by the first device 2000. Therefore, in another embodiment, the processor 1700 further establishes a loudness correction model according to loudness information of a directly obtained audio testing signal and an audio correcting signal. The processor 1700 firstly corrects a first audio signal received by the first audio sensor 1100 according to the loudness correction model, and subtracts a corrected audio playing signal from the first audio signal to obtain a second audio signal. The foregoing several embodiments may be implemented separately or in combination with each other, and the present invention is not limited thereto.

Specifically, in the training mode, the processor 1700 controls an audio testing signal outputted by the first device 2000. In one embodiment, the first device 2000 may output the audio testing signal (ex: a segment of speech) with a first volume setting value (ex: 20) to the processor 1700 directly and then the processor 1700 obtains an audio correcting signal with a first sound intensity (ex: 50 dB) via the first audio sensor 1100. And then, the processor 1700 further controls the first device 2000 to output an audio testing signal with a second volume setting value (ex: 15) to the processor 1700 directly. The processor 1700 obtains an audio correcting signal with a second sound intensity (ex: 40 dB) from the first audio sensor 1100. Repeat the above steps several times, the processor 1700 may establish a loudness correction model according to a plurality of audio testing signals and a plurality of audio correcting signals corresponding to the audio testing signals, and describe a relationship between an audio playing signal (an audio testing signal in the training mode) outputted by the first device 2000 and a first audio signal received by the first audio sensor 1100.

In one embodiment, the processor 1700 determines whether the first device 2000 is playing a program (such as a TV program or radio program) when the processor 1700 receives a first audio signal in the non-training mode. The processor 1700 obtains an audio playing signal from the first device 2000 when the first device 2000 is playing the program and processes the audio playing signal according to the loudness correction model to obtain corresponding waveform and loudness in the first audio signal. After obtaining the waveform and loudness in the first audio signal, the processor 1700 eliminates a component corresponding to the audio playing signal from the first audio signal to obtain a second audio signal. In other words, in this embodiment, the audio playing signal processed by the loudness correction model is eliminated from the first audio signal.

In another embodiment, the processor 1700 determines whether the first device 2000 is playing a program when the processor 1700 receives the first audio signal in the non-training mode. When the first device 2000 is playing a program, the processor 1700 converts a first audio signal into information whose format is the same as an audio playing signal according to the relationship described by the loudness correction model, and subtracts the audio playing signal from the first audio signal processed by the loudness correction model to obtain a second audio signal according to a previously obtained time difference. In other words, in this embodiment, the audio playing signal is eliminated from the first audio signal after the loudness correction model processes the first audio signal.

In some cases, there may be multiple people in an area in which the AV control system 1000 is located. Therefore, in an embodiment, the processor 1700 further determines whether a third audio signal corresponds to a second account when the first audio sensor 1100 simultaneously receives a first audio signal and the third audio signal. The processor 1700 only processes the first audio signal to obtain a control signal when the third audio signal does not correspond to the second account. In other words, when a guest visits a user's home in which the AV control system 1000 is located, voices emitted by the guest is ignored since the voice of the guest is not corresponding to a pre-set of the AV control system 1000.

In one embodiment of the present disclosure, the storage medium stores a first and second instruction sets. The first instruction set is associated with a first account and the second instruction set is associated with a second account. When a third audio signal is corresponding to the second account, the processor 1700 determines the priority of the first account and the second account to decide to use the first instruction set or the second instruction set to generate a control signal. Specifically, members of one family includes, for example, a father (first account), a mother (second account), a sister (third account), and a younger brother (fourth account). The second account has a first order, the first account has a second order, the third account has a third order, and the fourth account has a fourth order. The father usually prefers to watch a movie channel, the mother usually prefers to watch a Japanese drama channel, the sister usually prefers to watch a Korean drama channel, and the younger brother usually prefers to watch a cartoon channel. If the father and the mother simultaneously give instructions to turn on a television, the processor 1700 turns on the first device 2000 (television) and switches an original channel of the first device 2000 to a Japanese drama channel. If the sister and the younger brother simultaneously give instructions to turn on the television, the processor 1700 turns on the first device 2000 switches an original channel of the first device 2000 to a Korean drama channel.

In another embodiment, refer to FIG. 1 again, the AV control system 1000 further comprises a second audio sensor 1200 which is communicatively connected to the controller 1600 and disposed in the second area (living room). The second audio sensor 1200 receives a second audio signal in the second area when the second audio sensor 1200 is enabled. The operating manner of the second audio sensor 1200 has been as described above and will not be described here. In addition, in this embodiment, the AV control system 1000 further comprises a second motion sensor 1500 for detecting a motion of a second object in the second area to generate a second motion detecting signal. The controller 1600 enables the second audio sensor 1200 according to the second motion detection signal. In this embodiment, the storage medium stores a first instruction set and a second instruction set. The first instruction set is associated with a first account and a first area, and the second instruction set is associated with the first account and the second area. Additionally, the controller 1600 can add a flag representing a specific instruction set to an audio signal. For example, the controller 1600 can add a first flag to the first audio signal and add a second flag to the second audio signal. The first flag corresponds to the first instruction set, and the second flag corresponds to the second instruction set. When the processor 1700 receives an unprocessed audio signal from the controller 1600, the processor 1700 can determine whether the unprocessed audio signal has the first flag or the second flag. When the unprocessed audio signal has the first flag, the processor 1700 selects the first instruction set to process the unprocessed audio signal to obtain a control signal. When the unprocessed audio signal has the second flag, the processor 1700 selects the second instruction set to process the unprocessed audio signal to obtain a control signal.

In addition, in other embodiments, the AV control system 1000 can also comprise a temperature sensor, a humidity sensor, an image sensor, or other suitable sensor (not shown). The controller 1600 can selectively enable all or a part of these sensors according to a user's instructions or according to an area in which the user is located. For example, when a user having a first account enters into a first area, the controller 1600 enables the temperature sensor and the humidity sensor. The user having the first account usually uses to live in a bedroom and the temperature and relative humidity in the bedroom are 24 degrees Celsius and 50% respectively. Then the processor 1700 can select whether to turn on an air conditioner/dehumidifier according to a sensing signal sent by the temperature sensor and/or the humidity sensor.

In view of the above description, the AV control system is automatically switched between a standby mode and an interactive mode by the first motion sensor so that a user can use the AV control system without sending a wake-up instruction.

What is claimed is:

1. An audio-video control system, adapted to control a first device and a second device, and the audio-video control system comprising:
 a first audio sensor, adapted to receive a first audio signal in a first area when the first audio sensor is enabled;
 a controller, communicatively connected to the first audio sensor and determining whether the first audio sensor receives the first audio signal;
 an audio player, communicatively connected to the controller; and
 a first motion sensor, communicatively connected to the controller and adapted to detect a motion of a first object in the first area so as to generate a first motion detecting signal, and the controller enabling the first audio sensor according to the first motion detecting signal; and
 a processor, communicatively connected to the controller and controlling the first and second devices via a local area network,
 wherein the processor controls the audio player to play an audio notifying signal according to the first motion detecting signal and determines whether a source of the first audio signal corresponds to a first account, wherein the processor processes the first audio signal to obtain a control signal to selectively control the first device or the second device when the source of the first audio signal corresponds to the first account, the first device is an audio-video device, the processor of the controller further obtains an audio playing signal from the audio-video device directly as an electrical or wireless signal that is not an audio sensor received by the first audio sensor, and the processor of the controller directly subtracts the audio playing signal played by the audio-video device from the first audio signal to obtain a second audio signal, wherein the processor processes the second audio signal to obtain the control signal, the processor further determines whether a third audio signal corresponds to a second account when the first audio sensor simultaneously receives the first audio signal and the third audio signal, and the processor only processes the first audio signal to obtain the control signal when the third audio signal doesn't correspond to the second account, and wherein the audio-video control system further comprises a storage medium storing a first instruction set related to the first account and a second instruction set related to the second account, and the processor determines the priority of the first account and the second account to decide to use the first instruction set or the second instruction set to generate the control signal when the third audio signal corresponds to the second account.

2. The audio-video control system in claim 1, wherein the processor is further communicatively connected to a cloud server via an internet, and the processor transmits the first audio signal to the cloud server and obtains the control signal from the cloud server.

3. The audio-video control system in claim 1, wherein the processor generates the control signal according to the first instruction set and analyzes the first audio signal when the processor processes the first audio signal to obtain the control signal.

4. The audio-video control system in claim 2 wherein the processor restrains noises of the first audio signal to obtain the second audio signal.

5. The audio-video control system in claim 4, wherein the processor further controls the audio-video device to play an audio testing signal and controls the first audio sensor to receive a correcting audio signal via the controller, the processor obtains a time difference according to the audio testing signal and the correcting audio signal, and the processor further restrains the noises of the first audio signal to obtain the second audio signal according to the time difference when the processor restrains the noises of the first audio signal to obtain the second audio signal according to the audio playing signal.

6. The audio-video control system in claim 3, wherein the processor further restrains noises of the first audio signal to obtain the second audio signal.

7. The audio-video control system in claim 6, wherein the processor further controls the audio-video device to play an audio testing signal and controls the first audio sensor to receive a correcting audio signal via the controller, the processor obtains a time difference according to the audio testing signal and the correcting audio signal, and the processor further restrains the noises of the first audio signal to obtain the second audio signal according to the time difference when the processor restrains the noises of the first audio signal to obtain the second audio signal according to the audio playing signal.

8. The audio-video control system in claim 1, wherein the processor only processes the first audio signal to obtain the control signal when the third audio signal doesn't correspond to the second account.

9. The audio-video control system in claim 1, further comprising:
a second audio sensor, communicatively connected to the controller and adapted to receive the second audio signal in a second area when the second audio sensor is enabled; and
a second motion sensor, communicatively connected to the controller and adapted to detect a motion of a second object in the second area to generate a second motion detecting signal, the controller enabling the second audio sensor according to the second motion detecting signal;
wherein the first instruction set is related to the first area, and the second instruction set is related to the second area;
wherein the controller further adds first and second flags to the first and second audio signals respectively, and the processor selects the first instruction set or the second instruction set to process the audio signal to obtain the control signal according to whether an unprocessed audio signal has the first flag or the second flag.

10. The audio-video control system in claim 1, wherein the processor further obtains the control signal according to a piece of time information.

11. The audio-video control system in claim 9, wherein the processor further obtains the control signal according to a piece of time information.

* * * * *